United States Patent [19]
D'Souza

[11] Patent Number: 5,764,550
[45] Date of Patent: Jun. 9, 1998

[54] ARITHMETIC LOGIC UNIT WITH IMPROVED CRITICAL PATH PERFORMANCE

[75] Inventor: Godfrey P. D'Souza, San Jose, Calif.

[73] Assignee: Sun Microsystems, Inc., Palo Alto, Calif.

[21] Appl. No.: 681,302

[22] Filed: Jul. 22, 1996

[51] Int. Cl.$^6$ .................................................. G06F 7/50
[52] U.S. Cl. ................................. 364/716.04; 364/788
[58] Field of Search ............................. 364/716.04, 788, 364/716.01

[56] References Cited

U.S. PATENT DOCUMENTS

| | | | |
|---|---|---|---|
| 3,100,835 | 8/1963 | Bedrij | 364/788 |
| 4,573,137 | 2/1986 | Ohhashi | 364/788 |
| 4,682,303 | 7/1987 | Uya | 364/788 |
| 5,272,662 | 12/1993 | Scriber et al. | 364/788 |
| 5,285,406 | 2/1994 | Lynch et al. | 364/788 |
| 5,299,319 | 3/1994 | Vassiliadis et al. | 364/716.04 |

OTHER PUBLICATIONS

Neil H.E. Weste and Kamran Eshraghian, "Principles of VMOS VLSI Design", A Systems Perspective, 1985, pp. 331-333.

*Primary Examiner*—David H. Malzahn
*Attorney, Agent, or Firm*—Limbach & Limbach L.L.P.

[57] ABSTRACT

An arithmetic logic unit (ALU) with improved critical path performance includes two sets of adder circuits, a logic circuit, a set of multiplexors and a decoder. The adder circuits perform redundant add operations, one with a unit carry input and one without a carry input, upon multiple respective portions of the two sets of input signal bits. The logic circuit performs Boolean logic operations upon the two sets of input signal bits. In accordance with a set of selection control signals, the multiplexors select among the multiple results of such redundant add operations and Boolean logical operations for outputting as the final output bits. Such selection control signals are generated by the decoder based upon the contents of the two sets of input signal bits.

21 Claims, 1 Drawing Sheet

ARITHMETIC LOGIC UNIT WITH IMPROVED CRITICAL PATH PERFORMANCE

BACKGROUND OF THE INVENTION

1. Field of the Invention

The present invention relates to microprocessors, and in particular, to arithmetic logic units (ALUs) used within microprocessors.

2. Description of the Related Art

As manufacturing technology for integrated circuits has advanced, the sizes of the semiconductor devices integrated into such circuits have become scaled down significantly. This has resulted in increasingly dense circuits being implemented, thereby allowing higher clock rates due to the reduced clock propagation delays between the integrated devices.

As a result of the smaller device sizes and increased clock rates, circuit performance, in terms of speed of operation, is now increasingly determined by the circuit architecture. For example, in a microprocessor, the ALU is the key functional unit that determines performance due to the fact the ALU is required for many, if not most, of the operations performed by the processor, as well as the fact that ALU operation is primarily serial, or pipelined, in nature.

Accordingly, it would be desirable to have an ALU architecture which provides for faster execution of most ALU operations.

SUMMARY OF THE INVENTION

In accordance with one embodiment of the present invention, an arithmetic logic unit with improved critical path performance includes two pluralities of adder circuits, a logic circuit, a plurality of selector circuits and a decoder circuit. The first plurality of adder circuits is configured to receive a carry bit and first and second pluralities of input bits and in accordance therewith provide a first plurality of sum bits. Each one of such adder circuits is configured to receive the carry bit and a respective portion of each one of the first and second pluralities of input bits and in accordance therewith provide a respective portion of the first plurality of sum bits. Each one of such respective portions of the first plurality of sum bits represents a sum of the carry bit and corresponding ones of the respective portions of each one of the first and second pluralities of input bits. The second plurality of adder circuits is configured to receive the first and second pluralities of input bits and in accordance therewith provide a second plurality of sum bits. Each one of such adder circuits is configured to receive another respective portion of each one of the first and second pluralities of input bits and in accordance therewith provide a respective portion of the second plurality of sum bits. Respective portions of each one of the first and second pluralities of adder circuits is configured to receive identical ones of the respective portions of each one of the first and second pluralities of input bits, and each one of the respective portions of the second plurality of sum bits represents a sum of corresponding ones of such other respective portions of each one of the first and second pluralities of input bits.

The logic circuit is configured to receive and process the first plurality of input bit and in accordance therewith provide a plurality of processed bits.

The plurality of selector circuits is coupled to the first and second pluralities of adder circuits and the logic circuit and is configured to selectively receive the first and second pluralities of sum bits, the plurality of processed bits and a plurality of selection control signals and in accordance therewith provide a plurality of output bits. Each one of such selector circuits is coupled to one of the respective portions of each one of the first and second pluralities of adder circuits and the logic circuit and is configured to receive therefrom a respective portion of each one of the first and second pluralities of sum bits and a respective portion of the plurality of processed bits, respectively, and to receive a respective portion of the plurality of selection control signals and in accordance therewith provide a respective portion of the plurality of output bits. The plurality of output bits, in accordance with the plurality of selection control signals, represents either a sum of the first and second pluralities of input bits or the plurality of processed bits. Individual ones of the plurality of selection control signals are generated such that each one of the selector circuits selects either one of the respective portions of the first and second pluralities of sum bits or the respective portion of the plurality of processed bits and provides such selected respective portion as a portion of the plurality of output bits.

The decoder circuit is coupled to the selector circuits and is configured to receive the first and second pluralities of input signals and a decode control signal and in accordance therewith provide the plurality of selection control signals. Individual ones of such selection control signals are generated such that each one of the selector circuits selects one of the respective portions of the first and second pluralities of sum bits and provides such selected portion of the first and second pluralities of sum bits as a respective portion of the plurality of output bits.

These and other features and advantages of the present invention will be understood upon consideration of the following detailed description of the invention and the accompanying drawings.

BRIEF DESCRIPTION OF THE DRAWING

The Figure is a functional block diagram of an arithmetic logic unit in accordance with one embodiment of the present invention.

DETAILED DESCRIPTION OF THE INVENTION

Figure 1:
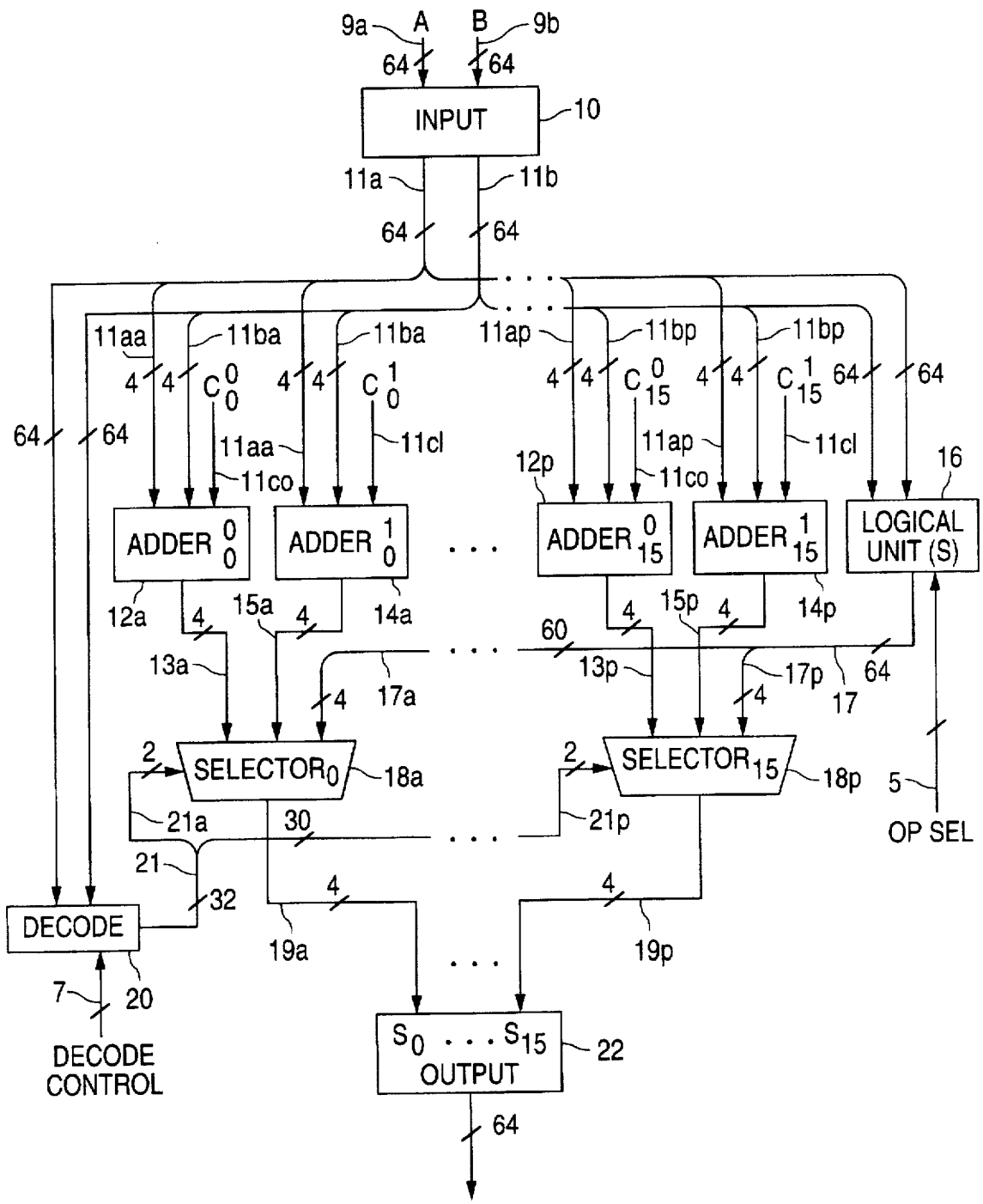

Referring to the Figure, an arithmetic logic unit (ALU) in accordance with one embodiment of the present invention includes two sets of redundant adders: "zero carry" adders 12a–12p; and "carry one" adders 14a–14p. Each adder 12a–12p, 14a–14p receives its own respective portion of each of the two sets of input bits 11a, 11b. The inputs 11a–11b are received via an input circuit 10 which can include memory circuits for storage and retrieval of such signals, input buffer circuits or other processing circuits.

Each one of the first set of adders 12a, 14a receives the four least significant bits (LSBs) 11aa of the first input 11a and the four LSBs 11ba of the second input 11b. Similarly, each one of the last set of adders 12p, 14p receives the four most significant bits (MSBs) 11ap of the first input 11a and the four MSBs 11bp of the second input 11b. (Further similarly, each of the remaining adders 12b–12o, 14b–14o [not shown for sake of simplicity] receive their own respective four-bit portions 11ab–11ao, 11bb–11bo of the inputs 11a, 11b.)

Additionally, each of the "zero carry" adders 12a–12p receives a carry bit 11c0 having a value of zero, while each of the "carry one" adders 14a–14p receives a carry bit 11c1 having a value of one. (it should be understood that the zero value carry bit 11c0 can be omitted, thereby resulting in simply an addition of two four-bit inputs without a carry bit.) Each adder 12a–12p, 14a–14p adds its respective four-bit inputs 11aa–11ap, 11ba–11bp and carry bit 11c0, 11c1 to produce a set of four-bit sums 13a–13p, 15a–15p. These sum bits 13a–13p, 15a–15p are provided as inputs to a set of selector circuits (e.g. multiplexors or switches) 18a–18p.

Also included is one or more logic units 16 which receive both of the inputs 11a, 11b. Such logical unit(s) 16 can include such circuits as shifters, Boolean logic operation circuits, etc., and in accordance with an operation select signal 5, perform such logic operation(s) to produce an output 17. This output 17 is provided as another input to the selector circuit 18a–18p, with the four LSBs 17a going to the first selector circuit 18a, and so on, with the four MSBs 17p going to the last selector circuit 18p.

A decode circuit 20 receives both of the original inputs 11a, 11b and, in accordance with a control signal 7, decodes such inputs signals 11a, 11b to produce a set of selection signals 21 for controlling the selector circuits 18a–18p. When the decode control signal 7 identifies the operation to be performed as an addition, the individual selection control signals 21a–21p cause the individual selector circuits 18a–18p to select among the "zero carry" sum signals 13a–13p and "carry one" sum signals 15a–15p. Alternatively, when the decode control signal 7 indicates a logical operation, the selection control signals 21a–21p select the logical operation result signals 17a–17p.

The resulting selected signals 19a–19p are provided to some form of output circuit 22 which can include memory for storage of such signals, output buffer circuits or additional processing circuits.

Based upon the foregoing, it can be seen that an ALU with an adder unit in accordance with the present invention has improved critical path performance due to the use of redundant, or speculative, add operations. By computing both possible results, i.e. with carry bits of both zero and one, and then selecting the appropriate results with a decision network operation speed is optimized since the redundant computation is performed in much less time than that needed by the decision network. Further, an ALU with an adder unit in accordance with the present invention eliminates the need for post selection multiplexors, thus improving computation time of the ALU critical path by the amount of time otherwise required by such multiplexors.

Additionally, further preselection can be used by including an additional selector stage between the logical units 16 and the selector circuits 18a–18p. Such additional selector stage can preselect among the results of the logic operations performed by the logical units 16, with the resulting preselected signals 17a–17p then being presented to the selector circuits 18a–18p along with the reductant sum signals 13a–13p, 15a–15p.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an arithmetic logic unit with improved critical path performance, said arithmetic logic unit comprising:

a first plurality of adder circuits configured to receive a carry bit and first and second pluralities of input bits and in accordance therewith provide a first plurality of sum bits, wherein each one of said first plurality of adder circuits is configured to receive said carry bit and a respective portion of each one of said first and second pluralities of input bits and in accordance therewith provide a respective portion of said first plurality of sum bits, and wherein each one of said respective portions of said first plurality of sum bits represents a sum of said carry bit and corresponding ones of said respective portions of each one of said first and second pluralities of input bits;

a second plurality of adder circuits configured to receive said first and second pluralities of input bits and in accordance therewith provide a second plurality of sum bits, wherein each one of said second plurality of adder circuits is configured to receive another respective portion of each one of said first and second pluralities of input bits and in accordance therewith provide a respective portion of said second plurality of sum bits, and wherein respective portions of each one of said first and second pluralities of adder circuits is configured to receive identical ones of said respective portions of each one of said first and second pluralities of input bits, and further wherein each one of said respective portions of said second plurality of sum bits represents a sum of corresponding ones of said another respective portions of each one of said first and second pluralities of input bits;

a logic circuit configured to receive and process said first plurality of input bits and in accordance therewith provide a plurality of processed bits;

a plurality of selector circuits, coupled to said first and second pluralities of adder circuits and said logic circuit, configured to selectively receive said first and second pluralities of sum bits, said plurality of processed bits and a plurality of selection control signals and in accordance therewith provide a plurality of output bits, wherein each one of said plurality of selector circuits is coupled to one of said respective portions of each one of said first and second pluralities of adder circuits and said logic circuit and is configured to receive therefrom a respective portion of each one of said first and second pluralities of sum bits and a respective portion of said plurality of processed bits, respectively, and to receive a respective portion of said plurality of selection control signals and in accordance therewith provide a respective portion of said plurality of output bits, and wherein said plurality of output bits, in accordance with said plurality of selection control signals, represents either a sum of said first and second pluralities of input bits or said plurality of processed bits, and further wherein said individual ones of said plurality of selection control signals are generated such that each one of said plurality of selector circuits selects either one of said respective portions of said first and second pluralities of sum bits or said respective portion of said plurality of processed bits and provides said selected respective portion of either said first and second pluralities of sum bits or said plurality of processed bits as a portion of said plurality of output bits; and a decoder circuit, coupled to said selector circuits, configured to receive said first and second pluralities of input signals and a decode control signal and in accordance therewith provide said plurality of selection control signals, wherein individual ones of said plurality of selection control signals are generated such that each one of said plurality of selector circuits selects one of said respective portions of said first and second pluralities of sum bits and provides said selected one of said respective portions of said first and second pluralities of sum bits as a respective portion of said plurality of output bits.

2. The apparatus of claim 1, wherein said first plurality of adder circuits comprises a plurality of four-bit adders with a carry bit input.

3. The apparatus of claim 1, wherein said plurality of selector circuits comprises a plurality of multiplexors.

4. The apparatus of claim 1, wherein said logic circuit comprises a plurality of Boolean logic operator circuits configured to perform selected Boolean logic operations upon said first plurality of input bits as said processing thereof.

5. The apparatus of claim 1, wherein said logic circuit comprises a shifter configured to selectively shift said first plurality of input bits as said processing thereof.

6. The apparatus of claim 1, wherein said logic circuit is configured to receive and process said first and second pluralities of input bits and in accordance therewith provide said plurality of processed bits.

7. The apparatus of claim 6, wherein said logic circuit comprises a plurality of Boolean logic operator circuits configured to perform selected Boolean logic operations upon said first and second pluralities of input bits as said processing thereof.

8. A computer including an arithmetic logic unit (ALU) with improved critical path performance, said computer comprising:

an input circuit configured to input and provide first and second pluralities of input bits;

a first plurality of adder circuits configured to receive a carry bit and first and second pluralities of input bits and in accordance therewith provide a first plurality of sum bits, wherein each one of said first plurality of adder circuits is configured to receive said carry bit and a respective portion of each one of said first and second pluralities input bits and in accordance therewith provide a respective portion of said first plurality of sum bits, and wherein each one of said respective portions of said first plurality of sum bits represents a sum of said carry bit and corresponding ones of said respective portions of each one of said first and second pluralities of input bits;

a second plurality of adder circuits configured to receive said first and second pluralities of input bits and in accordance therewith provide a second plurality of sum bits, wherein each one of said second plurality of adder circuits is configured to receive another respective portion of each one of said first and second pluralities of input bits and in accordance therewith provide a respective portion of said second plurality of sum bits, and wherein respective portions of each one of said first and second pluralities of adder circuits is configured to receive identical ones of said respective portions of each one of said first and second pluralities of input bits, and further wherein each one of said respective portions of said second plurality of sum bits represents a sum of corresponding ones of said another respective portions of each one of said first and second pluralities of input bits;

a logic circuit configured to receive and process said first plurality of input bits and in accordance therewith provide a plurality of processed bits;

a plurality of selector circuits, coupled to said first and second pluralities of adder circuits and said logic circuit, configured to selectively receive said first and second pluralities of sum bits, said plurality of processed bits and a plurality of selection control signals and in accordance therewith provide a plurality of output bits, wherein each one of said plurality of selector circuits is coupled to one of said respective portions of each one of said first and second pluralities of adder circuits and said logic circuit and is configured to receive therefrom a respective portion of each one of said first and second pluralities of sum bits and a respective portion of said plurality of processed bits, respectively, and to receive a respective portion of said plurality of selection control signals and in accordance therewith provide a respective portion of said plurality of output bits, and wherein said plurality of output bits, in accordance with said plurality of selection control signals, represents either a sum of said first and second pluralities of input bits or said plurality of processed bits, and further wherein said individual ones of said plurality of selection control signals are generated such that each one of said plurality of selector circuits selects either one of said respective portions of said first and second pluralities of sum bits or said respective portion of said plurality of processed bits and provides said selected respective portion of either said first and second pluralities of sum bits or said plurality of processed bits as a portion of said plurality of output bits;

a decoder circuit, coupled to said selector circuits, configured to receive said first and second pluralities of input signals and a decode control signal and in accordance therewith provide said plurality of selection control signals, wherein individual ones of said plurality of selection control signals are generated such that each one of said plurality of selector circuits selects one of said respective portions of said first and second pluralities of sum bits and provides said selected one of said respective portions of said first and second pluralities of sum bits as a respective portion of said plurality of output bits; and an output circuit, coupled to said decoder circuit, configured to receive and output said plurality of output bits.

9. The computer of claim 8, wherein said first plurality of adder circuits comprises a plurality of four-bit adders with a carry bit input.

10. The computer of claim 8, wherein said plurality of selector circuits comprises a plurality of multiplexors.

11. The computer of claim 8, wherein said logic circuit comprises a plurality of Boolean logic operator circuits configured to perform selected Boolean logic operations upon said first plurality of input bits as said processing thereof.

12. The computer of claim 8, wherein said logic circuit comprises a shifter configured to selectively shift said first plurality of input bits as said processing thereof.

13. The computer of claim 8, wherein said logic circuit is configured to receive and process said first and second pluralities of input bits and in accordance therewith provide said plurality of processed bits.

14. The computer of claim 13, wherein said logic circuit comprises a plurality of Boolean logic operator circuits configured to perform selected Boolean logic operations upon said first and second pluralities of input bits as said processing thereof.

15. A method of providing an apparatus including an arithmetic logic unit with improved critical path performance, said method comprising the steps of:

providing a first plurality of adder circuits configured to receive a carry bit and first and second pluralities of input bits and in accordance therewith provide a first plurality of sum bits, wherein each one of said first plurality of adder circuits is configured to receive said carry bit and a respective portion of each one of said first and second pluralities of input bits and in accordance therewith provide a respective portion of said first plurality of sum bits, and wherein each one of said respective portions of said first plurality of sum bits represents a sum of said carry bit and corresponding ones of said respective portions of each one of said first and second pluralities of input bits;

providing a second plurality of adder circuits configured to receive said first and second pluralities of input bits and in accordance therewith provide a second plurality of sum bits, wherein each one of said second plurality of adder circuits is configured to receive another respective portion of each one of said first and second pluralities of input bits and in accordance therewith provide a respective portion of said second plurality of sum bits, and wherein respective portions of each one of said first and second pluralities of adder circuits is configured to receive identical ones of said respective portions of each one of said first and second pluralities of input bits, and further wherein each one of said respective portions of said second plurality of sum bits represents a sum of corresponding ones of said another respective portions of each one of said first and second pluralities of input bits;

providing a logic circuit configured to receive and process said first plurality of input bits and in accordance therewith provide a plurality of processed bits;

providing a plurality of selector circuits, coupled to said first and second pluralities of adder circuits and said logic circuit, configured to selectively receive said first and second pluralities of sum bits, said plurality of processed bits and a plurality of selection control signals and in accordance therewith provide a plurality of output bits, wherein each one of said plurality of selector circuits is coupled to one of said respective portions of each one of said first and second pluralities of adder circuits and said logic circuit and is configured to receive therefrom a respective portion of each one of said first and second pluralities of sum bits and a respective portion of said plurality of processed bits, respectively, and to receive a respective portion of said plurality of selection control signals and in accordance therewith provide a respective portion of said plurality of output bits, and wherein said plurality of output bits, in accordance with said plurality of selection control signals, represents either a sum of said first and second pluralities of input bits or said plurality of processed bits, and further wherein said individual ones of said plurality of selection control signals are generated such that each one of said plurality of selector circuits selects either one of said respective portions of said first and second pluralities of sum bits or said respective portion of said plurality of processed bits and provides said selected respective portion of either said first and second pluralities of sum bits or said plurality of processed bits as a portion of said plurality of output bits; and providing a decoder circuit, coupled to said selector circuits, configured to receive said first and second pluralities of input signals and a decode control signal and in accordance therewith provide said plurality of selection control signals, wherein individual ones of said plurality of selection control signals are generated such that each one of said plurality of selector circuits selects one of said respective portions of said first and second pluralities of sum bits and provides said selected one of said respective portions of said first and second pluralities of sum bits as a respective portion of said plurality of output bits.

16. The method of claim 15, wherein said step of providing a first plurality of adder circuits comprises providing a plurality of four-bit adders with a carry bit input.

17. The method of claim 15, wherein said step of providing a plurality of selector circuits comprises providing a plurality of multiplexors.

18. The method of claim 15, wherein said step of providing a logic circuit comprises providing a plurality of Boolean logic operator circuits for performing the step of performing selected Boolean logic operations upon said first plurality of input bits as said processing thereof.

19. The method of claim 15, wherein said step of providing a logic circuit comprises providing a shifter for performing the step of selectively shifting said first plurality of input bits as said processing thereof.

20. The method of claim 15, wherein said step of providing a logic circuit comprises providing a logic circuit configured to receive and process said first and second pluralities of input bits and in accordance therewith provide said plurality of processed bits.

21. The method of claim 20, wherein said step of providing a logic circuit comprises providing a plurality of Boolean logic operator circuits for performing the step of performing selected Boolean logic operations upon said first and second pluralities of input bits as said processing thereof.

* * * * *

UNITED STATES PATENT AND TRADEMARK OFFICE
CERTIFICATE OF CORRECTION

PATENT NO. : 5,764,550
DATED : June 9, 1998
INVENTOR(S) : Godfrey P. D'Souza

It is certified that error appears in the above-identified patent and that said Letters Patent is hereby corrected as shown below:

Column 5, claim 8,
Line 42, delete "pluralities input" and insert -- pluralities of input --.

Signed and Sealed this

Sixth Day of November, 2001

Attest:

NICHOLAS P. GODICI
Attesting Officer     Acting Director of the United States Patent and Trademark Office